Dec. 31, 1963    M. N. WEBER    3,115,944
SUPPORTING AND WEIGHING DEVICE WITH ELASTOMERIC SEALING RING
Filed July 13, 1959    3 Sheets-Sheet 1
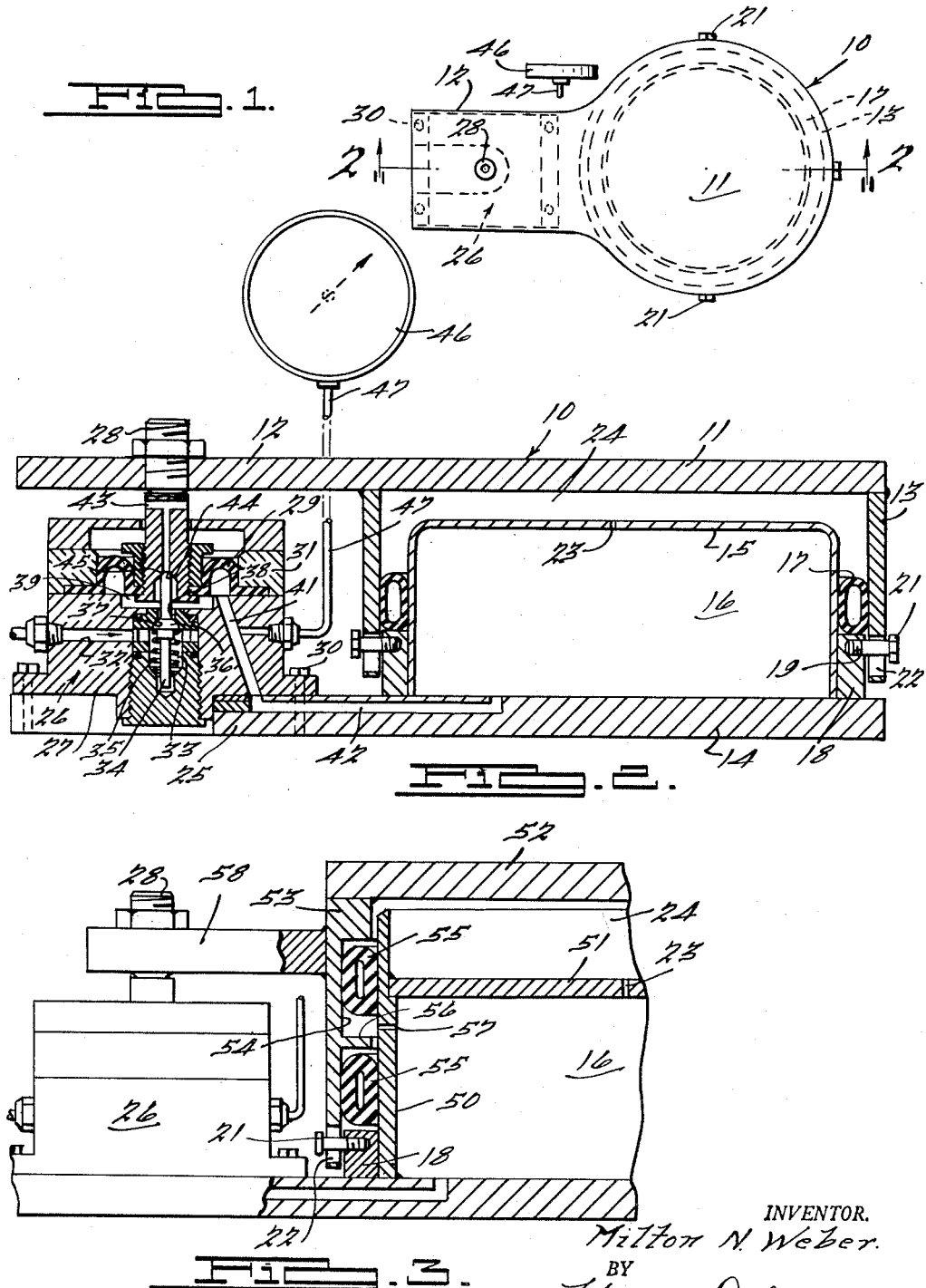
INVENTOR.
Milton N. Weber.
BY
Harness, Dickey & Pierce
ATTORNEYS.

Dec. 31, 1963   M. N. WEBER   3,115,944
SUPPORTING AND WEIGHING DEVICE WITH ELASTOMERIC SEALING RING
Filed July 13, 1959   3 Sheets-Sheet 2

INVENTOR.
Milton N. Weber
BY
Harness, Dickey & Pierce
ATTORNEYS.

Dec. 31, 1963    M. N. WEBER    3,115,944
SUPPORTING AND WEIGHING DEVICE WITH ELASTOMERIC SEALING RING
Filed July 13, 1959    3 Sheets-Sheet 3
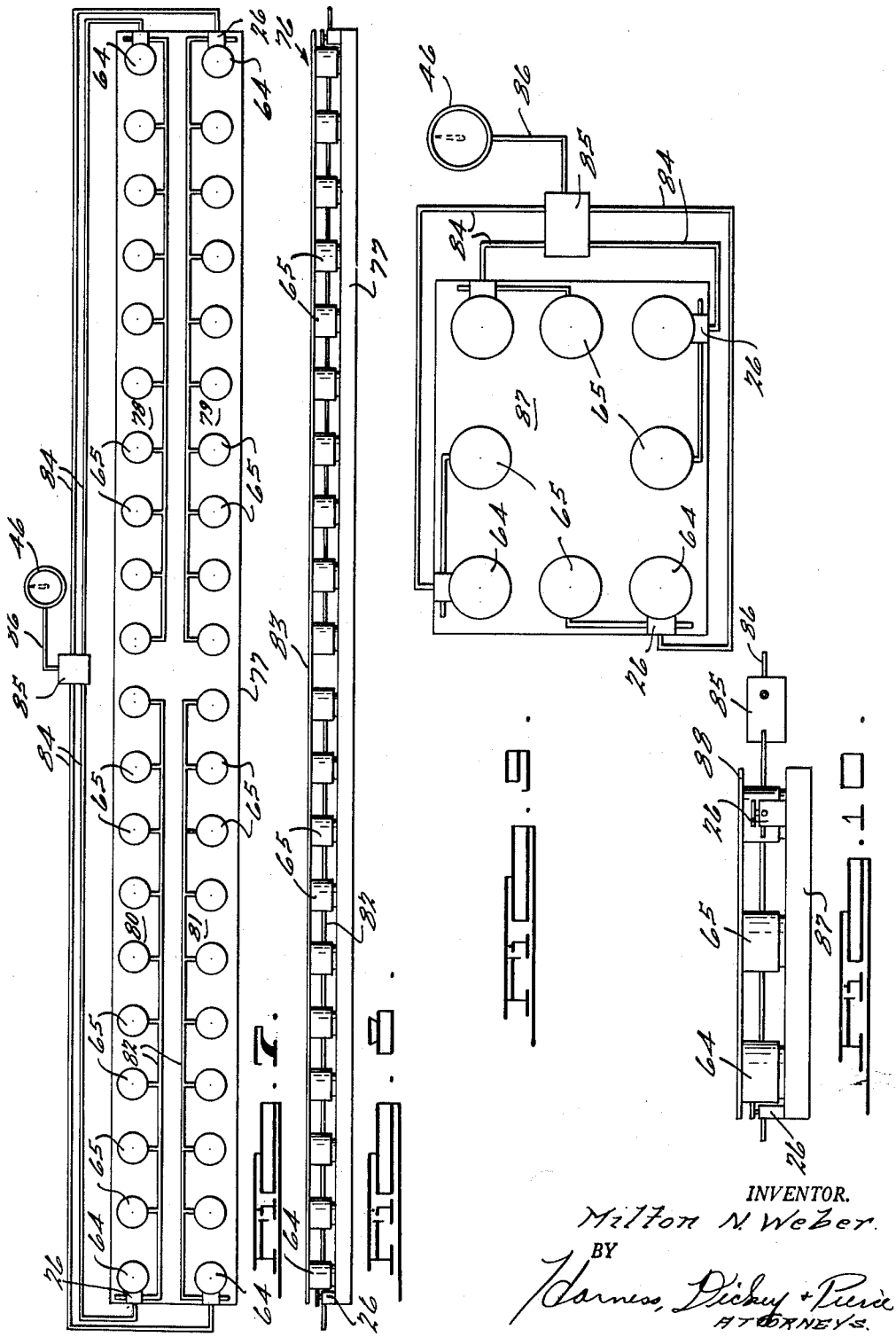
INVENTOR.
Milton N. Weber.
BY
Harness, Dickey & Pierce.
ATTORNEYS.

United States Patent Office 3,115,944
Patented Dec. 31, 1963

3,115,944
SUPPORTING AND WEIGHING DEVICE WITH
ELASTOMERIC SEALING RING
Milton N. Weber, Dearborn, Mich., assignor to National
Testing and Research Laboratories, Inc.
Filed July 13, 1959, Ser. No. 826,833
3 Claims. (Cl. 177—209)

This invention relates to supporting and weighing devices, and particularly to a fluid sensitive supporting and weighing device of the self-contained type.

The present invention is an improvement over that of the M. N. Weber application Serial No. 683,547, filed September 12, 1957, now Patent No. 2,956,761, for a similar device. In that device, a single platform was supported by a pair of chambers, the smaller one of which contained a valve which controlled the admission or escape of air to and from the chambers to maintain a spaced a predetermined distance from the base. One chamber was formed on the base and the platform was sealed thereover. The other chamber contained a stem which was sealed to a body member and was engaged by a projecting stud threaded to the platform.

In the present arrangement, a base has a reservoir of inverted cup shape welded or otherwise secured thereto and provided with a metering opening for the escape of air which is delivered through a passageway in the base to the reservoir. The platform has a main portion substantially cylindrical in shape from which a cylindrical flange extends in spaced relation to the wall of the reservoir. A hollow tubular ring is disposed between the inner surface of the cylindrical flange and the outer surface of the reservoir wall and is flattened therebetween in a manner to permit the ring to roll between the surfaces when the telescoped wall and flange are extended and retracted. A metal ring is secured about the reservoir to the base and is provided with shouldered screws extending through slots in the cylindrical flange of the platform to limit the movement thereof.

The base portion also supports a control device having a body containing a chamber, a valve and a sealed stem which is secured to the platform. Air is delivered through the body to the valve, and when the platform is lowered from normal position, due to a weight thereon, the air will enter the chamber of the device, pass to the reservoir and bleed into the main chamber. The pressure built up in the two chambers will cause the platform to rise to normal position, at which the valve will close against the admission of air. When the platform is unloaded, the expansion of air into the chambers will cause the platform to be raised, carrying the stem of the device therewith and moving a valve seat at the mouth of a passageway therethrough away from the valve to permit air in both of the chambers to pass outwardly through the stem to atmosphere. The pressure of air is relieved to a degree which permits the platform to return to normal position to have the valve seat re-engage the valve and prevent any further escape of the air. A self-contained supporting and weighing device is provided having a cylindrical flange on the platform which is telescoped over the cylindrical wall of the reservoir and maintained in sealed relation therewith by a hollow tubular ring which may roll between the surfaces thereof. The major portion of the weight is supported by the air within the cylindrical flange of the platform, the remaining portion being supported by the chamber of the device having the stem actuated by the platform.

Accordingly, the main objects of the invention are: to provide a supporting and weighing device with a pair of chambers, the smaller one of which contains a valve for regulating the flow of air to and from both of the chambers; to provide a platform for a supporting and weighing device with a cylindrical flange which telescopes over a cylindrical reservoir and is sealed thereto by a hollow resilient ring; to support a platform on two air chambers, the larger one of which supports the major portion of a load, the remaining portion being supported by the smaller chamber having a valve therein for controlling the flow of air to and from the chambers; to provide a weighing device with a cylindrical reservoir and a cylindrical flange of a platform telescoped thereover in sealed relation when secured for limited movement thereon; to provide a plurality of fluid responsive weighing devices for supporting a platform, container and the like which are connected to an averaging device from which averaged fluid is conducted to an indicating device; to provide a plurality of fluid responsive weighing devices having fluid connection to fluid supporting devices which are responsive to the control elements of the weighing devices, and, in general, to provide a self-contained supporting and weighing device which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a plan view of a supporting and weighing device embodying features of the present invention;

FIG. 2 is an enlarged, sectional view of the structure illustrated in FIG. 1, taken on the line 2—2 thereof;

FIG. 3 is a broken view of structure, similar to that illustrated in FIG. 2, showing another form thereof;

FIG. 7 is a plan view of a weighing device of large capacity, with the platform removed therefrom;

FIG. 8 is a view, in elevation, of the structure illustrated in FIG. 7, having a platform thereon;

FIG. 9 is a view of weighing and assisting devices interconnected in a manner embodying features of the present invention, with the platform removed, and FIG. 10 is a view, in elevation, of the structure illustrated in FIG. 9, with the platform added.

Figure 4:
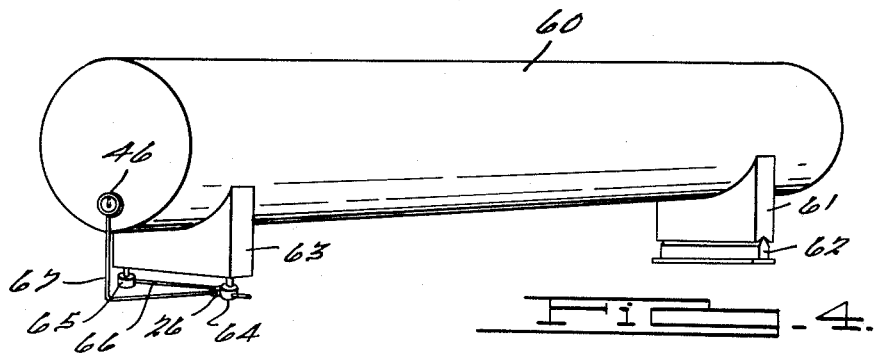
FIG. 4 is a view of a tank having a weighing device at one end, embodying features of the present invention.

Referring more specifically to FIGS. 1 and 2, the supporting and weighing device of the present invention embodies a platform 10 having a cylindrical portion 11 and an extending portion 12. The portion 11 has a cylindrical flange 13 extending downwardly therefrom forming a cylinder in sealed relation to the platform portion 10. A base 14 of a shape similar to that of the platform 10 has an inverted cup-shaped element 15 welded or otherwise secured thereto to form a reservoir 16 in spaced relation to the cylindrical flange 13 which is telescoped thereover. A tubular ring 17 of rubber or other elastomeric material is disposed between the cylindrical wall of the element 15 and the inner surface of the cylindrical flange 13, the surfaces being spaced apart a shorter distance than the diameter of the ring which is substantially flattened therebetween, as illustrated in FIG. 2. This permits the rolling of the material of the ring along the surfaces as the outer cylindrical flange moves upwardly and downwardly relative to the element 15. A ring 18 is secured to the base 14 and the lower portion of the wall of the element 15, having a plurality of threaded apertures 19 therein for receiving the threaded end of the shouldered screws 21 which extend through slots 22 in the lower portion of the cylindrical flange 13 of the platform. This limits the movement of the platform 10 relative to the base 14. An opening 23 in the end wall of the element 15 meters air into the chamber 24 formed between the element 15 and the platform and cylindrical flange 13 for supporting the major portion of the platform load.

On the extending portion 25 of the base, a control device 26 is secured by screws 30. The device is employed for supporting a minor portion of the load and for controlling the flow of air into and out of the chamber 24. The device 26 has a body 27 to which a stem 28 is secured in sealed relation by a flexible diaphragm 29 and a ring 31. An intake passageway 32 for air extends through the body 27 into a chamber 33 containing a valve 34 and a spring 35. A valve shoulder 36 on the valve body engages a seat 37 at the mouth of a passageway 38 which communicates with a chamber 39 containing the lower face of the stem 28. A passageway 41 extends from the chamber 39 to a passageway 42 in the base 14 which communicates with the reservoir 16. The stem 28 contains an exhaust passageway 43 having a seat 44 at its inner end engaged by a valve head 45 on the upper end of the valve 34. The stem is positioned by a stud 30 having a locking nut thereon which permits the platform to be accurately positioned, with both ports of the device 26 closed.

When the platform 10 is raised slightly upwardly from the position illustrated in FIG. 2, air can pass from both chambers 24 and 39 to atmosphere through the passageway 43 in the stem 28. When the platform is slightly lowered beyond the position illustrated in FIG. 2, the valve shoulder 36 is moved from the seat 37 to permit air to enter the reservoirs 24 and 39 and return the platform to the position illustrated in FIG. 2, which will occur when the valve shoulder 36 again engages the seat 37. The position as illustrated in FIG. 2 is the normal position of the platform for whatever weight is applied thereto. The pressure of air in the system may be measured by the dial 46 which is connected by a conduit 47 to the passageway 41. The dial is preferably calibrated to directly indicate the load placed upon the platform. The metering orifice 23 prevents the sudden movement of the platform when the load is changed and controls the passage of air from the reservoir into the chamber 24 or from the chamber 24 back into the reservoir. The orifice dampens the movement of the platform and prevents any damage to the parts of the supporting and weighing device. The arrangement is unique in that the platform may change its elevation and the chamber its volume without changing its area so that the confined pressure is a measure in pounds per square inch of the load, irrespective of the weight thereof. Since the area does not change, a very accurate weighing of the load results.

In FIG. 3, a further form of the invention is illustrated, that wherein a supporting and weighing device of greater capacity than that illustrated in FIG. 2 is shown. In this arrangement, the reservoir 16 is formed from a heavy cylindrical wall 50 and a circular top plate 51, with the top of the wall 50 extending in close proximity to a platform 52. A cylindrical wall 53 on the platform contains a notch 54 in which a hollow sealing ring 55 is maintained. Below the flange 56 at the bottom of the notch, a second sealing element is provided. The ring 18 and screws 21 in slots 22 through the cylindrical wall 53 are employed to limit the movement of the platform relative to the base, the same as in the structure of FIG. 2. An extension 58 is welded to the wall 53 containing a stud 30 which engages the stem 28 of the device 26 in the manner as pointed out hereinabove. In addition to the metering orifice 23 for permitting the air to travel into the chamber 24, a metering orifice 57 is provided in the wall 50 between the sealing rings 55 to balance the air pressure between the upper ring and walls to avoid the possibility of air leaking faster about the upper ring than can enter the chamber 39 through the orifice 23.

FIG. 4 discloses a further application of the weighing device of the present invention. A tank 60, having a liquid therein, is maintained in a horizontal position at all times. The supporting element 61 rests upon a fulcrum 62 at the rear end of the tank. The supporting element 63 at the front end of the tank rests upon a weighing device 64 and an assisting device 65, the latter lacking a control device 26. The control device 26 on the weighing device 64 has a passageway communicating with the chamber 24 and connected by a conduit 66 to the chamber 24 within the assisting device 65. A conduit 67 connects the passageways to the chambers 24 to the indicating device 46. Any change in weight of the fluid within the tank 60 causes the supporting element 63 to be lowered or raised a very slight amount, sufficient, however, to unseat a valve to operate the control device 26 and admit or discharge fluid to or from the chambers, bringing the tank again into level postion.

Figure 5:
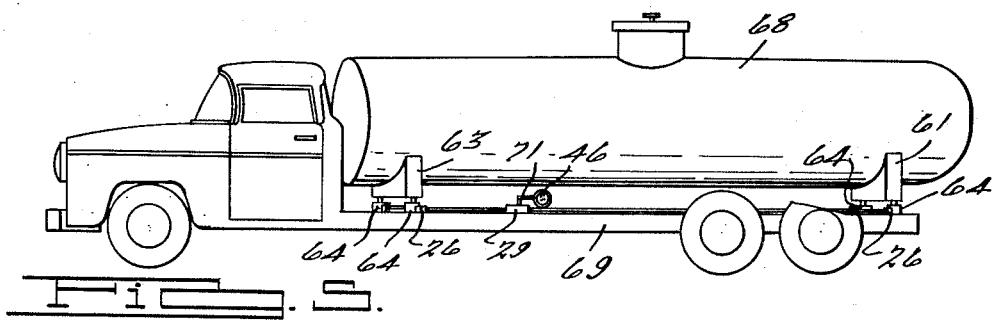
FIG. 5 is a view of a tank mounted on a chassis frame and having weighing devices associated therewith.

In FIG. 5, a tank 68 is shown mounted on a chassis frame 69 by having both the rear and front supporting elements 61 and 63 rest upon the weighing device 64. The four control devices 26 are connected to an averaging device 29 from which the averaged pressure is conducted to an indicating device 46 through a conduit 71. Irrespective of whether or not the tank 68 is horizontal or any portion is deflected, a true weight is obtained which is recorded on the indicating device. When a platform or element is supported on weighing and assisting devices, three or more of the devices must have a control device thereon so that any point that is deflected will actuate one or more of the control devices to change the pressure in the chamber thereof and in that of an associated device.

Figure 6:
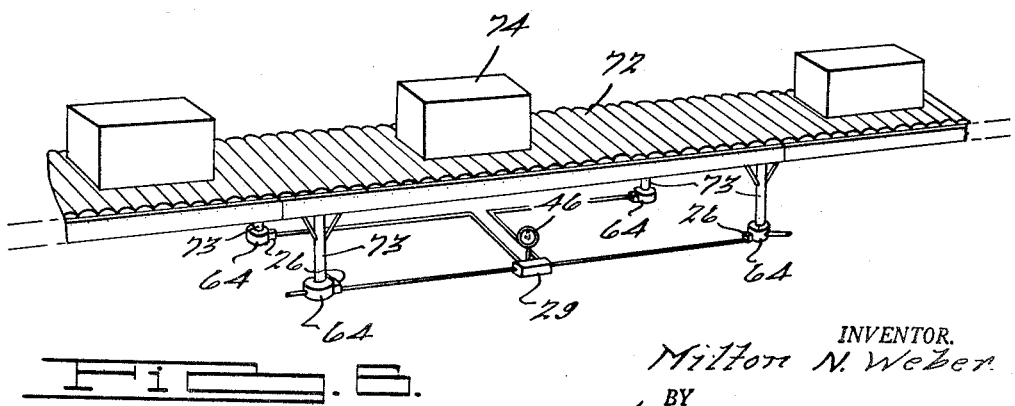
FIG. 6 is a perspective view of a section of a conveyor mounted on weighing devices, embodying features of the present invention.

In FIG. 6, a conveyor section 72 has four legs 73, a pair of which is disposed at opposite ends of the conveyor table. Each leg is supported on a weighing device 64. Pressure within the chambers 24 is conducted to the averaging device 29 from the control devices 26 of the weighing devices 64 from which the averaged pressure is conducted to the indicator 46. As a box 74 or other article to be weighed is passed across the conveyor section 72, the weight thereof may be read on the indicator 46.

In FIGS. 7 and 8, a large weighing device 76 is illustrated upon which trucks may be driven and moved from station to station to have different materials added thereto to provide a mixture within the truck. The scale illustrated is 125 feet long, 12 feet wide, and is capable of weighing at least 100 tons. This provides a very accurate and a cheap scale to manufacture, the base 77 supporting four groups 78, 79, 80 and 81, each group composed of ten weighing and assisting devices 64 and 65. The devices 64 are located at the corners and have a passageway from the control devices 26 thereof connected by conduits 82 to the nine assisting devices 65 of each respective group. The corner weighing devices 64 control the pressure in the adjacent nine assisting devices 65, and all portions of the platform 83, resting upon the devices, respond uniformly to support the load, with the devices maintaining the platform level and at a predetermined height from the base 77. When a weight is placed upon the platform 83, it will deflect, causing the control device 26 to respond to apply additional pressure to the associated group of assisting devices to raise the platform 83 at the deflected points to its original position, spaced an exact distance from the base 77. The four devices 26 are connected by the four conduits 84 to an averaging device 85 from which the averaged pressure is conducted to an indicating device 46 by a conduit 86. It is to be understood that the dimensions and number of the devices will change from that herein set forth for weighing devices of greater or smaller capacities. It is further to be understood that the averaging device may be of any type well known in the art to be suitable, such as that employing pistons or diaphragms within a chamber individually associated with the conduits 84. The pistons or diaphragms collectively change the volume of the chamber through their movement thereinto caused by a change in pressure of the fluid in the conduits 84 which causes the fluid within the chamber to change the indication of the dial 46 and provide a reading for the average pressure.

A similar platform weighing device is illustrated in FIGS. 9 and 10, that wherein a base 87 supports a weighing device 64 at each corner, with an assisting device 65 therebetween. Each weighing device has an air passageway from its chamber 24 to the compartment of the assisting device and conduits 84 connect the corner devices 64 to an averaging device 85 from which a conductor 86 directs the averaged pressure to the indicating device 46 which will accurately show the weight placed upon a platform 88 which rests upon the devices 64 and 65.

In any of the structures herein illustrated, a positively operated, rugged supporting and weighing device is provided which is self-contained and substantially indestructible. The platform has a constant area so that the same number of square inches are affected by the change in pressure, permitting the pressure indications to provide an accurate reading for the weight resting upon the platform. Any movement toward or away from the base operates the control of the control device for admitting or exhausting air so that the platform will always be maintained at the same height from the base. A number of the weighing devices may be employed to support a platform, a tank and the like, having a control device associated therewith, or an assisting device having the control device omitted may be controlled by that of the weighing device. The plurality of control devices have the pressure directed to an averaging device from which the averaged pressure provides a true indication of the load on the entire platform. It is to be understood that while supporting a load any vibration thereof is not transferred to the base of the device or any vibration to the base is not transferred to the load because of the air support for the platform.

What is claimed is:

1. In a load supporting and weighing device, a pair of plates, cylinders having smooth adjacent walls secured to said plates and disposed in telescoped spaced relation to each other, a ring in the form of a hollow tube of elastomeric material disposed between the smooth walls of said cylinders, with the tube flattened a substantial amount and sealing an area within the cylinders to form an air chamber, an a device having two moving parts secured to the plates and containing valve means which controls the flow of air to and from the chamber when the plates are moved toward and away from each other, the area between the two moving parts of the device forming a chamber communicating with said first chamber and operating as a supporting device therewith.

2. In a load supporting and weighing device, a pair of plates, cylinders having smooth adjacent walls secured to said plates and disposed in telescoped spaced relation to each other, a ring in the form of a hollow tube of elastomeric material disposed between the smooth walls of said cylinders, with the tube flattened a substantial amount and sealing an area within the cylinders to form an air chamber, a device having two moving parts secured to the plates and containing valve means which controls the flow of air to and from the chamber when the plates are moved toward and away from each other, the area between the two moving parts of the device forming a chamber communicating with said first chamber and operating as a supporting device therewith, and means for limiting the movement of the plates toward and away from each other while permitting the degree of movement thereof necessary to produce the operation of the valve to control the flow of air to and from the chambers.

3. In a weighing device for an element, a platform, a plurality of devices supporting said platform, each device having a chamber, pairs of said devices being interconnected and one of said interconnected devices having a control device for admitting and exhausting air relative to said pair of chambers in response to a change in the load placed upon said platform, an averaging device to which chamber pressure in the control devices is conducted, and air actuated indicating means connected to said averaging device for indicating the averaged pressures and the weight of the load.

References Cited in the file of this patent

UNITED STATES PATENTS

| 1,070,461 | Garback | Aug. 19, 1913 |
| 1,481,362 | Guelbaum | Jan. 22, 1924 |
| 2,352,935 | Bohannan | July 4, 1944 |
| 2,528,895 | Mathews | Nov. 7, 1950 |
| 2,596,032 | Keef | May 6, 1952 |
| 2,613,925 | Weber | Oct. 14, 1952 |
| 2,756,983 | Furcini | July 31, 1956 |
| 2,860,017 | Honegger | Nov. 11, 1958 |
| 2,895,773 | McConnaughey | July 21, 1959 |
| 2,909,367 | Goehrig et al. | Oct. 20, 1959 |
| 2,956,761 | Weber | Oct. 18, 1960 |

FOREIGN PATENTS

| 21,749 | Great Britain | of 1891 |

UNITED STATES PATENT OFFICE
CERTIFICATE OF CORRECTION

Patent No. 3,115,944                                December 31, 1963

Milton N. Weber

It is hereby certified that error appears in the above numbered patent requiring correction and that the said Letters Patent should read as corrected below.

Column 1, line 18, after "maintain a" insert -- balanced pressure condition when the platform was --.

Signed and sealed this 9th day of June 1964.

(SEAL)
Attest:

ERNEST W. SWIDER                                     EDWARD J. BRENNER
Attesting Officer                                         Commissioner of Patents